United States Patent
Nellitheertha

(10) Patent No.: US 7,506,203 B2
(45) Date of Patent: Mar. 17, 2009

(54) EXTRACTING LOG AND TRACE BUFFERS IN THE EVENT OF SYSTEM CRASHES

(75) Inventor: Hariprasad V. Nellitheertha, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 11/271,248

(22) Filed: Nov. 10, 2005

(65) Prior Publication Data

US 2007/0168699 A1 Jul. 19, 2007

(51) Int. Cl.
G06F 11/00 (2006.01)

(52) U.S. Cl. .................................................. 714/20

(58) Field of Classification Search ............... 714/15, 714/20, 45
See application file for complete search history.

(56) References Cited

U.S. PATENT DOCUMENTS

| | | | |
|---|---|---|---|
| 5,111,384 A | | 5/1992 | Aslanian et al. |
| 5,339,406 A | | 8/1994 | Carney et al. |
| 5,999,933 A | | 12/1999 | Mehta |
| 6,226,761 B1 | | 5/2001 | Berstis |
| 6,393,560 B1 * | | 5/2002 | Merrill et al. ................ 713/2 |
| 6,434,696 B1 | | 8/2002 | Kang |
| 6,543,010 B1 * | | 4/2003 | Gaudet et al. ................ 714/45 |
| 6,728,907 B1 | | 4/2004 | Wang et al. |
| 7,302,559 B2 * | | 11/2007 | Oguma ............................ 713/1 |
| 2002/0035706 A1 * | | 3/2002 | Connor et al. ................ 714/15 |
| 2002/0078338 A1 | | 6/2002 | Lay et al. |
| 2002/0083156 A1 | | 6/2002 | Wysoczynski |
| 2002/0108033 A1 | | 8/2002 | Kroening |
| 2002/0166083 A1 | | 11/2002 | Anderson et al. |
| 2003/0204710 A1 * | | 10/2003 | Culter et al. ................ 713/1 |
| 2004/0205399 A1 | | 10/2004 | Wang et al. |
| 2006/0282654 A1 * | | 12/2006 | Veen et al. ................ 713/1 |
| 2007/0061613 A1 * | | 3/2007 | Ohashi et al. ................ 714/6 |
| 2007/0101191 A1 * | | 5/2007 | Iwama ........................ 714/15 |

FOREIGN PATENT DOCUMENTS

EP 1 215 578 A2 10/2001

OTHER PUBLICATIONS

Pfiffer, Andy; Reducing System Reboot Time with kexec; http://www.osdl.org/andyp@osdl.org; (10 pages).

(Continued)

Primary Examiner—Bryce P Bonzo
(74) Attorney, Agent, or Firm—Schmeiser, Olsen & Watts; William H. Steinberg

(57) ABSTRACT

A method for extracting data of a buffer after a failure of an operating system. An application is registered prior to the failure. The registering includes identifying a buffer in which the data to be extracted is stored prior to the failure. The buffer is reserved to maintain the data residing in the buffer as unchanged from initiation to completion of a fast reboot of the operating system. The fast reboot is responsive to the failure. An in-memory file is generated during the fast reboot, points to the data residing in the buffer, and is stored in volatile memory and not in persistent storage. The data is extracted via an instruction which is executed by the application after completion of the fast reboot, and which operates on the in-memory file.

18 Claims, 6 Drawing Sheets

OTHER PUBLICATIONS

Candea, et al.; JAGR: An Autonomous Self-Recovering Application Server; IEEE Computer Society; Proceedings of the Autonomic Computing Workshop Fifth Annual International Workshop on Active Middleware Services (AMS'03); ISBN 0-7695-1983-0/01; 10 pages.

Xu, et al.; Networked Windows NT System Field Failure Data Analysis; Center for Reliable and High Performance Computing; University of Illinois at Urbana-Champaign; E-mail: {junxu, kalbar,iyer}@crhc.uiuc.edu.

* cited by examiner

EXTRACTING LOG AND TRACE BUFFERS IN THE EVENT OF SYSTEM CRASHES

BACKGROUND OF THE INVENTION

1. Technical Field

The present invention relates to extracting data after an operating system failure, and more particularly to extracting data from log and trace buffers after an operating system failure.

2. Related Art

Logging and tracing tools collect vital information (i.e., log and trace data) related to a program running on a computing system. The collected information is initially written to a memory buffer, and subsequently recorded in a file on a persistent storage medium (e.g., hard disk). Utilities separate from the log and trace tools are used to analyze the log and trace data collected and recorded. When a system crash occurs, log and trace data is important for problem determination, but this data may not have been completely written out to persistent storage before the system crash occurred. Typically, the most important portions of log and trace data are those that are collected closest to the time of the crash, but those are also the portions that are most likely to be missing from the persistent storage files.

Conventional techniques attempting to address the retrieval of log or trace data stored in buffers in the event of a system crash include: kernel level debuggers, crash dump tools, and the Linux Kernel Messages Dump tool (kmsgdump). Kernel level debuggers are limited because they require a re-creation of the system problem, and are unable to record the contents of buffers automatically. Crash dump tools (e.g., Linux Kernel Crash Dump (LKCD) and In-memory core dump system for Linux) are limited by the time-consuming and inefficient dump of the entire system memory or large portions of memory when only a relatively small portion of memory includes the desired buffers. Further, undesirable development and maintenance costs are related to intelligence that must be built into either the crash dump tool or a separate utility that extracts the desired buffers from the dump. Additional development costs are involved because this intelligence must be customized for each log or trace tool. The kmsgdump tool extracts messages from the system at crash time and transfers them onto a floppy diskette, but costly customized, hardware-dependent code must be developed and maintained for each device.

Therefore, there is a need for an improved technique for extracting log and trace data from buffers in the event of a system crash.

SUMMARY OF THE INVENTION

In first embodiments, the present invention provides a method of extracting data of a buffer after a failure of an operating system, wherein the data is stored in the buffer prior to said failure, the method comprising:

registering an application prior to said failure, said registering comprising identifying a buffer in which data resides, said data stored in said buffer by said application, said application being executed under said operating system;

reserving said buffer, said reserving maintaining said data residing in said buffer as unchanged from an initiation of a reboot of said operating system responsive to said failure to a completion of said reboot, said reboot being a fast reboot;

generating an in-memory file during said reboot, said in-memory file pointing to said data residing in said buffer, and said in-memory file being stored in said volatile memory and not in a persistent storage medium; and extracting said data via an instruction operating on said in-memory file, said instruction executed by said application after said completion of said reboot.

In second embodiments, the present invention provides a system extracting data of a buffer after a failure of an operating system, wherein the data is stored in the buffer prior to said failure, the system comprising:

means for registering an application prior to said failure, said registering comprising means for identifying a buffer in which data resides, said data stored in said buffer by said application, said application being executed under said operating system;

means for reserving said buffer, said reserving maintaining said data residing in said buffer as unchanged from an initiation of a reboot of said operating system responsive to said failure to a completion of said reboot, said reboot being a fast reboot;

means for generating an in-memory file during said reboot, said in-memory file pointing to said data residing in said buffer, and said in-memory file being stored in said volatile memory and not in a persistent storage medium; and means for extracting said data via an instruction operating on said in-memory file, said instruction executed by said application after said completion of said reboot.

In third embodiments, the present invention provides at least one program storage device readable by a machine, tangibly embodying at least one program of instructions executable by the machine to perform a method of extracting data of a buffer after a failure of an operating system, wherein the data is stored in the buffer prior to said failure, the method comprising:

registering an application prior to said failure, said registering comprising identifying a buffer in which data resides, said data stored in said buffer by said application, said application being executed under said operating system;

reserving said buffer, said reserving maintaining said data residing in said buffer as unchanged from an initiation of a reboot of said operating system responsive to said failure to a completion of said reboot, said reboot being a fast reboot;

generating an in-memory file during said reboot, said in-memory file pointing to said data residing in said buffer, and said in-memory file being stored in said volatile memory and not in a persistent storage medium; and extracting said data via an instruction operating on said in-memory file, said instruction executed by said application after said completion of said reboot.

In fourth embodiments, the present invention provides a method for deploying computing infrastructure, comprising integrating computer-readable code into a computing system, wherein the code in combination with the computing system is capable of performing a process of extracting data of a buffer after a failure of an operating system, wherein the data is stored in the buffer prior to said failure, the process comprising:

registering an application prior to said failure, said registering comprising identifying a buffer in which data resides, said data stored in said buffer by said application, said application being executed under said operating system;

reserving said buffer, said reserving maintaining said data residing in said buffer as unchanged from an initiation of a reboot of said operating system responsive to said failure to a completion of said reboot, said reboot being a fast reboot;

generating an in-memory file during said reboot, said in-memory file pointing to said data residing in said buffer, and said in-memory file being stored in said volatile memory and not in a persistent storage medium; and extracting said data via an instruction operating on said in-memory file, said instruction executed by said application after said completion of said reboot.

Advantageously, the present invention enhances serviceability of operating systems by providing a reliable method and system for obtaining, after a system crash, contents of log and trace buffers, wherein the contents had been saved prior to the crash. The buffer contents are extracted without loss of any log and trace information due to the crash. After a system reboot, the present invention provides an easy-to-use interface that allows writing out the buffer contents. The present invention provides a novel, infrastructure that can be utilized by any application, tool or utility to preserve the contents of its buffers in the event of a system crash. That is, the novel infrastructure disclosed herein is a common infrastructure that can be shared by multiple applications, tools, and utilities, thereby avoiding the need for multiple extraction mechanisms, each with coding customized for a particular application, tool or utility. Further, as the present invention is implemented in the kernel layer, it is easy to prevent misuse of the disclosed method by hackers.

DETAILED DESCRIPTION OF THE INVENTION

Figure 1:
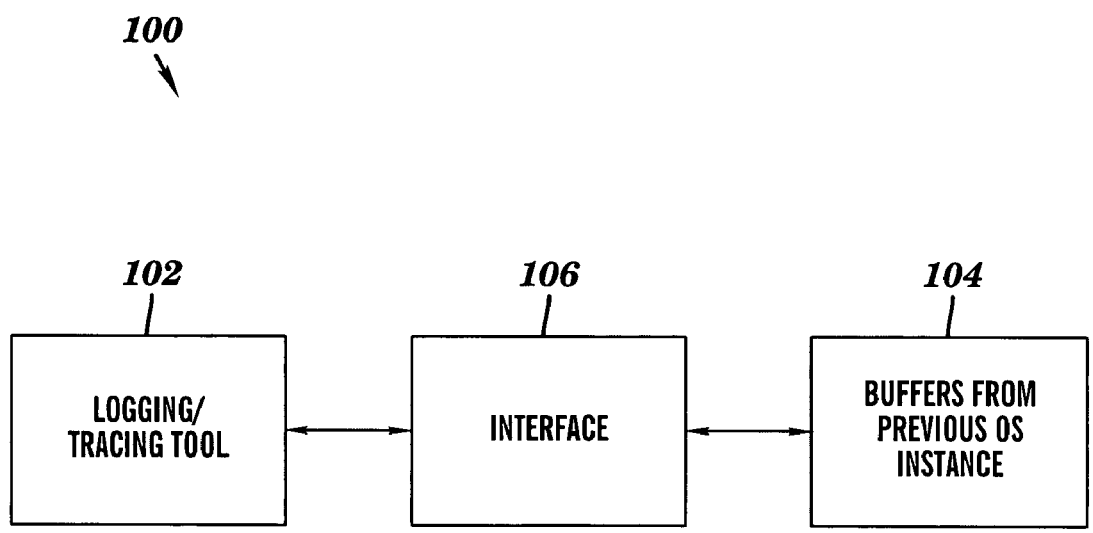
FIG. 1 is a block diagram of a system for extracting data of buffers after a failure of an operating system, in accordance with embodiments of the present invention.

The method and system of the present invention discloses a single, common, efficient mechanism which an operating system can provide to users (e.g., applications and device drivers) of operating system resources, and which can extract log or trace buffer data in the event of a system crash. The log or trace buffer data is stored when a computing system is running a first instance of the operating system which runs prior to a system crash, and the extraction of the data occurs when a second instance of the operating system is running. The second instance is generated by a fast reboot performed in response to the system crash.

Definitions

The following definitions apply to the present invention as disclosed herein:

Operating System: Software that manages a computing system and facilitates the running of software programs on the computing system by acting as an interface between software programs and system hardware. Operating system functions include managing hardware (e.g., random access memory (RAM), hard disks, printers, floppy drives, CD-ROM drives, sound and video cards, and other devices), providing a graphical interface to the users, ensuring security of the system, and providing network infrastructure.

Kernel: The core component of any operating system. The kernel acts as an interface between hardware and other system components (software programs, device drivers, etc). The kernel runs at a "privileged" level and can perform most of the permitted operations on the hardware.

Device drivers: Software that manages a particular hardware device in a computing system. A device driver runs at the same privilege level as the kernel. Examples of device drivers include keyboard drivers and network card drivers.

System crash: A state under which the operating system, and consequently the rest of the software, either fails or detects that it is unable to continue. Reasons for a system crash include access to invalid memory regions, data corruption, or deadlocks.

Logging tool: A mechanism by which applications or device drivers capture essential information for service personnel during system operation. The information or "log" (a.k.a. log data) is initially written into one or more buffers, which are memory regions (e.g., in random access memory), and subsequently transferred to a storage medium or device, such as a hard disk or floppy disk (e.g., in the form of one or more files). Utilities or tools separate from the logging tool are written to analyze the log data. An example of a logging tool is the syslog mechanism in the Linux operating system kernel.

Tracing tool: A mechanism to track the flow of code in a particular piece of software. Similar to the collection of log data with a logging tool, a tracing tool initially writes the data it collects (a.k.a. trace data) into buffers, and subsequently transfers the data to files on a storage medium/device. An example of a tracing tool is the dprobes tracing tool for the Linux operating system kernel.

Booting: The process of bringing up a computer system into a useable state. Booting includes steps such as verifying the devices attached to the system, running the operating system, initializing various devices, etc.

Rebooting: The process of exiting or shutting down the current context of the operating system and redoing the booting process as described in the definition of "booting". During a reboot, it is possible to switch to a different kernel, different device drivers or even a completely different operating system.

Fast Reboot Feature

When working with operating systems, system reboot times are a major bottleneck. For example, production systems, where system availability is a significant requirement, and software developers, who need to reboot the system multiple times during their work, both require a method of quickly rebooting a system and returning it to working condition. Such a method is provided by a "fast reboot" feature.

If a fast reboot is not performed, the typical stages of a system reboot are:

(1) The current system is shutdown. File systems are unmounted, files are written back to storage media, and applications are terminated;

(2) System firmware or the Basic Input/Output System (BIOS) is handed over control to perform basic operations such as checking devices present on the system, resetting the devices, clearing system memory, etc.;

(3) The firmware or BIOS hands over control to a boot loader. The boot loader loads the operating system kernel and hands over control to the kernel; and (4) The operating system kernel brings up the processors in the system, initializes devices, mounts file systems, loads applications and brings the system to a useable condition (e.g., the operating system is ready to interact with a user).

As described above, when an operating system reboots without a fast reboot, firmware or the Basic Input/Output System (BIOS) erases system memory contents (i.e., the memory contents from the kernel existing before the reboot are completely erased). In contrast, when the system performs a fast reboot, stages (2) and (3) described above are skipped. Thus, a fast reboot avoids the system memory clearing process, and memory contents from the previous kernel (i.e., the kernel existing before the fast reboot) remain available after the fast reboot. One example of a fast reboot feature for the Linux kernel is kexec, which is described at http://www-106.ibm.com/developerworks/linux/library/l-kexec.html and in Pfiffer, Andy, "Reducing System Reboot Time With kexec, Open Source Development Labs, Inc., which is available at http://www.osdl.org/docs/reducing_system_reboot_time_with_kexec.pdf.

The present invention employs the fast reboot feature and its side-benefit of memory contents being preserved from one kernel to the next to extract (i.e., obtain) data of buffers after a system crash. Hereinafter, unless otherwise noted, the term "reboot" refers to a reboot that utilizes a fast reboot feature.

Overview of System

FIG. 1 is a block diagram of a system for extracting data of buffers after a failure of an operating system, in accordance with embodiments of the present invention. In system 100, a logging tool or tracing tool extracts data from buffers 104 via an interface 106. The logging or tracing tool resides in, for example, an operating system kernel (not shown). The data to be extracted is collected and saved prior to a system crash and made available across a reboot. As used herein, "across a reboot" (a.k.a. "across a system crash") is defined as subsequent to a transition from a first instance (i.e., first context) of an operating system existing immediately before a system crash to a second instance (i.e., second context) of the operating system generated by a reboot performed in response to the crash.

Interface 106 is provided by the present invention and includes various modules comprising an infrastructure built into the operating system kernel. The infrastructure allows logging and tracing tools to quickly and easily access their respective buffers whose contents are saved prior to a system crash and preserved so that they are accessible after a reboot. The modules comprising the infrastructure are described below relative to FIG. 2.

Buffer Extraction Process

Figure 2:
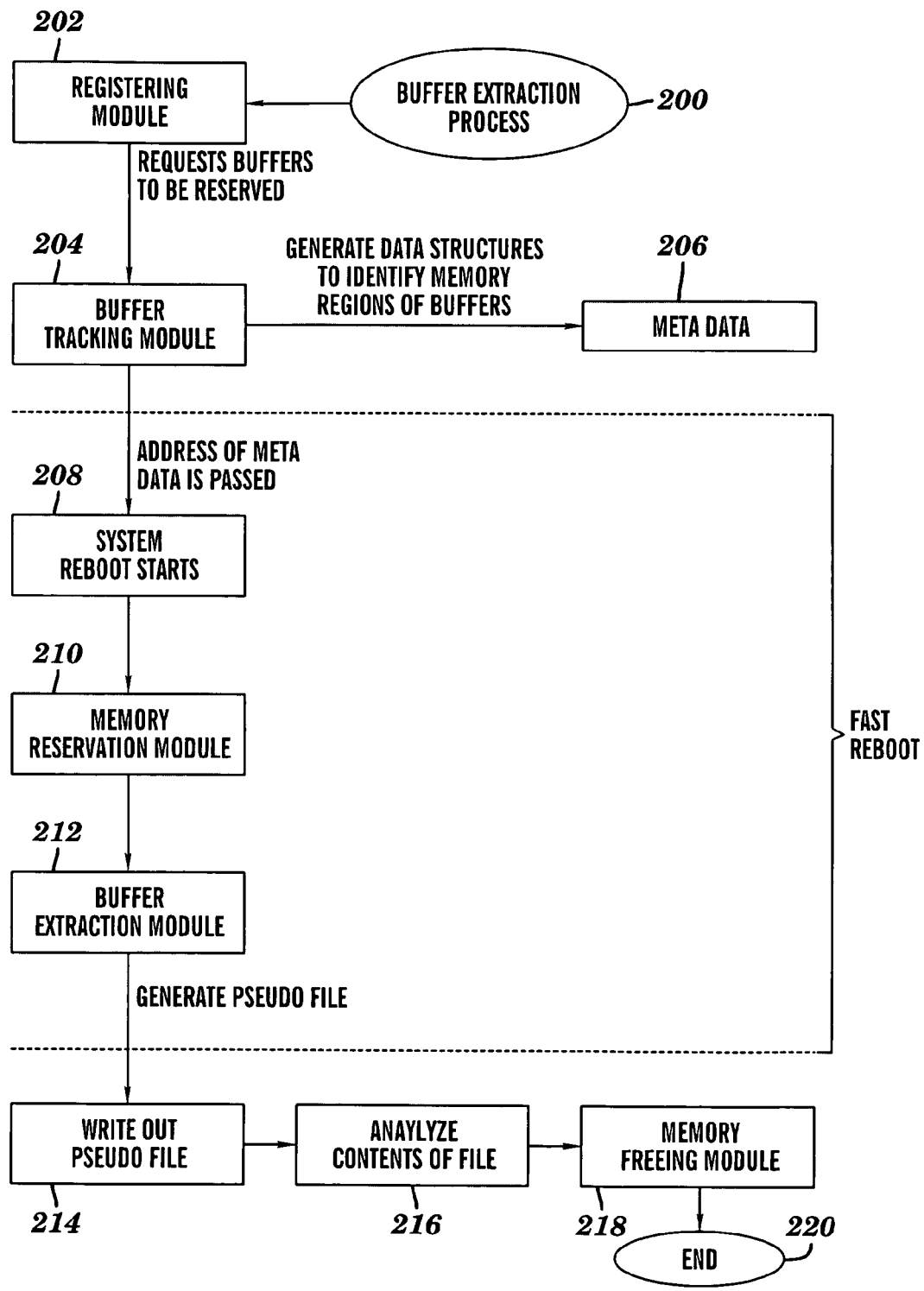
FIG. 2 is a flow diagram depicting a process of extracting data of a buffer of the system of FIG. 1, in accordance with embodiments of the present invention.

FIG. 2 is a flow diagram depicting a process of extracting data of a buffer of the system of FIG. 1, in accordance with embodiments of the present invention. Extracting data of a buffer or extracting contents of a buffer is also referred to herein simply as extracting a buffer or buffer extraction. A buffer extraction process begins at step 200. A registering module 202 registers itself with a buffer tracking module 204. In alternate embodiments, a plurality of registering modules registers with buffer tracking module 204. Registering modules are software applications executed under the operating system, and include, for instance, applications, tools and utilities designed for problem determination tasks, such as logging tools and tracing tools. Hereinafter, the terms "application" "utility" and "tool" are used interchangeably, and refer specifically to software that stores data in a region of volatile memory prior to a system crash, wherein that data is to be extracted after the crash. The registration made by registration module 202 includes a request to buffer tracking module 204 that identifies memory regions (i.e., buffers) in volatile memory that store data that needs to be made available across a reboot (e.g., buffer data needed by a logging tool). The data is stored in the identified memory regions by registration module 202. That is, the identified memory regions store data prior to a system crash and the present invention makes that data accessible after a reboot of the operating system, which is performed in response to the crash. The aforementioned identification performed by registering module 202 is also referred to herein simply as identifying memory regions to be preserved across the reboot.

For example, an application creates and utilizes data structures 1 through 10 during its operation. Since the application allocates memory for these data structures, the application has knowledge of the amount of memory allocated and the memory addresses associated with each data structure. When this application requests a registration with buffer tracking module 204, the application identifies data structure 1 as a data structure whose memory region needs to be preserved across a reboot. The registration request identifies this memory region by including the amount of memory allocated to data structure 1 and the starting memory address of data structure 1.

The registration made by registration module 202 is accepted by buffer tracking module 204. For each registration, buffer tracking module 204 records the registering module that requested the registration and the memory regions identified in the registration, and stores the identified memory region information in meta data 206 (i.e., one or more data structures). As used herein, memory region information is defined as an amount of memory required by the memory region and a base memory address of the memory region, such as the starting address of the region. Meta data 206 is maintained by buffer tracking module 204 and is made available across the reboot, as described below. Meta data 206 includes a registration name, the size of the memory region needed by registering module 202, a list of memory regions needed by registering module 202, and other details. The registration name identifies the registering module 202 that made the registration request, and is used after the reboot to associate the stored memory region information included in the request with the registering module that made the request. The list of memory regions is, for example, a linked list with each node of the list indicating the address of the start of the memory region to be preserved and the size of the memory region.

The storage location of meta data 206 is either a fixed location in memory or a memory address that exists in a first kernel and is passed across to a second kernel that is booted to during a fast reboot performed in response to a system crash, as described below. It will be apparent to those skilled in the art that techniques exist for passing addresses to a second kernel.

Buffer tracking module 204 also allows dynamic (i.e., real time) updating of memory region information in meta data 206 to reflect changes in memory usage by registering module 202. These changes in memory usage are changes to the memory region information, and include, for example, an increase in memory usage for data to be preserved across a reboot, or a freeing up of memory for such data.

At some point after the data structures in meta data 206 are generated, a system crash occurs. Subsequent to the crash, a reboot in step 208 is initiated utilizing a fast reboot feature. The portion of FIG. 2 depicted between the dotted lines includes steps that occur and modules whose actions occur during the fast reboot. Again, the fast reboot skips the typical clearing of system memory by firmware or BIOS. During the reboot, a memory reservation module 210 operates and accesses the memory region information in meta data 206. In the aforementioned case of passing a meta data memory address to a second kernel, memory reservation module 210 receives the meta data address being passed. During the reboot, but before the kernel starts to allocate memory for use by other components (e.g., device drivers and applications), memory reservation module 210 instructs a memory management module (not shown) of the kernel to reserve the memory regions indicated in meta data 206. This reservation ensures that the memory regions to be preserved across the reboot are not allocated for use by any other user of operating system resources. As used herein, a user of operating system resources includes applications and device drivers. This reservation also ensures that the data residing in the indicated memory regions is maintained in an unchanged state from the beginning of the reboot to the completion of the reboot.

After the memory regions indicated by meta data 206 are reserved by memory reservation module 210, a buffer extraction module 212 operates during the reboot. For every registration received by buffer tracking module 204, a pseudo file is created by buffer extraction module 212. As used herein, a pseudo file (a.k.a. in-memory file) is defined as a sequence of data bits stored as a named unit in volatile memory (e.g., RAM) only, without any backup storage in a non-volatile medium (i.e., persistent storage medium). The name of the pseudo file identifies or points to the data stored in volatile memory. Pseudo files resemble typical computer files except that computer files are stored on non-volatile storage media (e.g., hard disk or floppy disk), whereas a pseudo file is stored in volatile memory only.

The pseudo file created by buffer extraction module 212 points to data, which is also the content of a memory region indicated by meta data 206. That is, the data of the pseudo file is the actual content of the memory region (i.e., buffer) which registering module 202 requested to be preserved across the reboot. As a logging tool does not have direct access to meta data 206, the pseudo file acts as an interface which allows the logging tool to access the buffers whose contents were preserved across the reboot.

For example, in the Linux kernel, pseudo files can be created using the "proc" file system. In this case, the pseudo file or in-memory file is not stored on any backing media (hard disk, floppy disk, etc). The pseudo file created by proc is accessible by its name in the /proc file system. For example, a proc-created pseudo file named xyz is referenced by /proc/xyz.

A pseudo file in the present invention is created using standard platform-independent file formats such as the Executable and Linking Format (ELF). Using standard platform-independent file formats is advantageous because it allows standard commands to be used to operate on the pseudo files, thereby avoiding a need for customized coding or hardware-dependent techniques to access the data of the preserved buffers. In step 214, after the reboot is completed, the pseudo file created by buffer extraction module 212 is written out using an instruction operating on the pseudo file (i.e., the content of the log or trace buffer preserved across the reboot is extracted). The instruction to write out the pseudo file is executed by registering module 202 after the completion of the reboot. In one embodiment, the instruction writes out the buffer data by referencing the pseudo file name, which precisely points to the buffer data without identifying any other contents of volatile memory. The pseudo file data is written out by, for example, a system administrator. In the case of the aforementioned /proc/xyz pseudo file, any standard file copy command, such as the Linux cp command, can be used to write out the file. Thus, data in log and trace buffers can be extracted by accessing the pseudo file by name with a standard command. Once the data is extracted, software tools which understand the content of the buffers are used in step 216 to analyze the log or trace data extracted.

After buffer contents have been extracted in step 214, the reserved memory regions may optionally be freed by a memory freeing module 218. One example of freeing up the reserved memory regions includes deleting the pseudo file corresponding to the buffers. Once the memory is freed, it can be re-used for normal kernel memory allocations. After writing out and analyzing the pseudo file data and after the optional step of freeing up memory associated with the reserved memory regions, the buffer extraction process ends at step 220.

As indicated by the buffer extraction process described above, registering module 202, buffer tracking module 204, memory reservation module 210, and buffer extraction module 212 collectively provide a single interface that can be utilized by any application that stores data in a buffer of volatile memory, wherein the data is to be extracted from that buffer after a system failure. This single interface can be commonly shared by any application. Future, the interface provides any application with the means for (1) registering the application, (2) reserving the memory regions that store the data to be extracted, so that no operating system resource user is allocated those memory regions during a reboot of the system, and (3) generating, during the reboot, the pseudo file that points to the data to be extracted. The reserving and generating features are automatically provided by the interface in response to the registration of the application. Thus, the interface provides an easy-to-use mechanism for extracting the data in the event of a system failure by utilizing an instruction operating on the pseudo file, as described above.

The Appendix presents code for implementing the buffer extraction process of FIG. 2. An example of the buffer extraction process is presented below. Although the examples presented herein address the preservation of buffer data utilized by applications, the present invention can also be exploited by device drivers to preserve device state information across fast reboots to facilitate resumption of operations from a previous state.

Example of Buffer Extraction

Figure 3A:
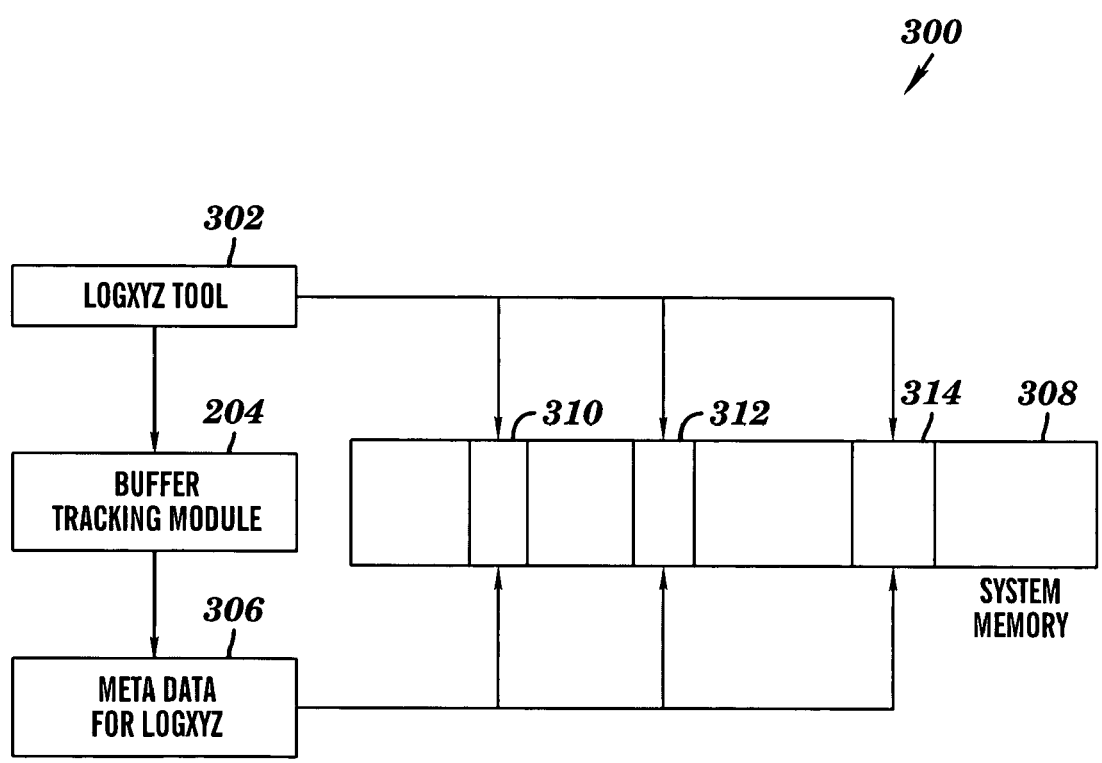
FIG. 3A depicts meta data of FIG. 2 storing memory regions of buffers of FIG. 1, in accordance with embodiments of the present invention.
Figure 3B:
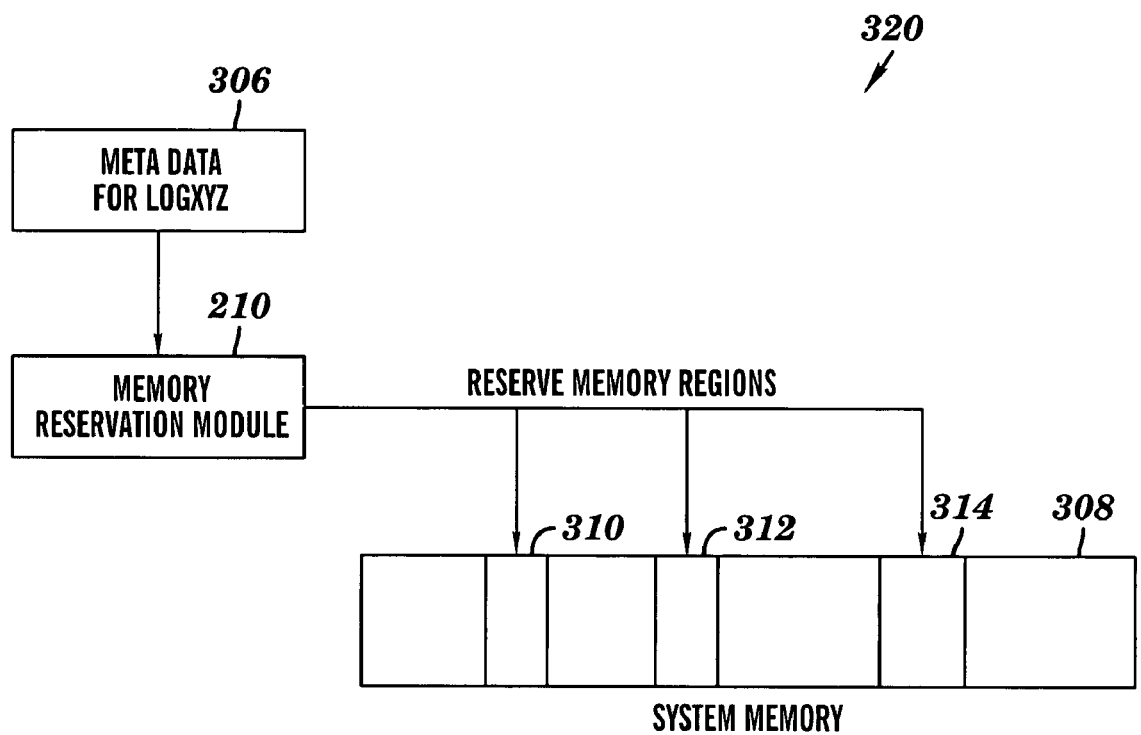
FIG. 3B depicts a memory reservation module of FIG. 2 reserving the memory regions of FIG. 3A, in accordance with embodiments of the present invention.
Figure 3C:
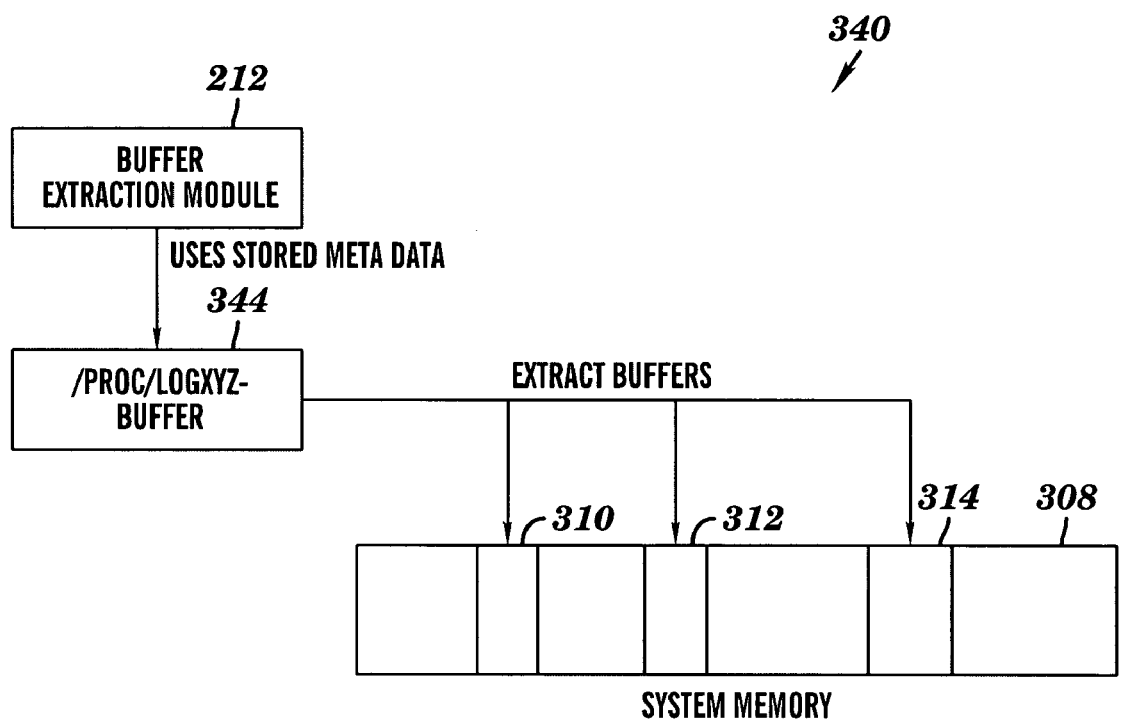
FIG. 3C depicts a buffer extraction module of FIG. 2 extracting buffers from the memory regions of FIG. 3A, in accordance with embodiments of the present invention.

FIGS. 3A-3C depict an example of an implementation of the buffer extraction process of FIG. 2. FIG. 3A depicts a first portion 300 of the buffer extraction process of FIG. 2 that focuses on the operation of buffer tracking module 204 prior to the system crash and fast reboot. A logging tool named logxyz tool 302 registers itself with buffer tracking module 204. Logging buffers utilized by logxyz are stored in system memory 308 at three different memory regions 310, 312, 314. Information about the size and starting address of memory regions 310, 312, 314 is collected by buffer tracking module 204 from the logxyz tool 302 and is stored in meta data for logxyz 306.

FIG. 3B depicts a second portion 320 of the buffer extraction process of FIG. 2 that focuses on the operation of memory reservation module 210. The system crashes due to a hang and subsequently a fast reboot is initiated. During the reboot stage, memory reservation module 210 accesses meta data for logxyz 306. Using the memory region information collected from its access of meta data for logxyz 306, memory reservation module 210 reserves the memory regions 310, 312, 314 residing in system memory 308. The memory regions reserved are the regions indicated by the meta data.

FIG. 3C depicts a third portion 340 of the buffer extraction process of FIG. 2 that focuses on the operation of buffer extraction module 212. During the reboot stage, buffer extraction module 212 uses the stored meta data for logxyz 306 (see FIG. 3B) to create a pseudo file named logxyz-buffer whose data is the contents of the memory regions 310, 312, 314 residing in system memory 308. The pseudo file is created in the /proc file system and is referenced as /proc/logxyz-buffer 344. Data of the log buffer of the logxyz tool 302 (see FIG. 3A) is extracted by performing a simple file copy operation. On a Linux system, the command:

cp /proc/logxyz-buffer /home/test/log.buf copies the buffer contents into a file called log.buf in the /home/test directory.

A log analyzer utility designed to be used with the logxyz tool analyzes the contents of the log.buf file Although the embodiment presented above utilizes only one log tool, the present invention contemplates scaling up system 100 (see FIG. 1) to several tools or utilities performing the operations described above simultaneously.

Computer System for Buffer Data Extraction

Figure 4:
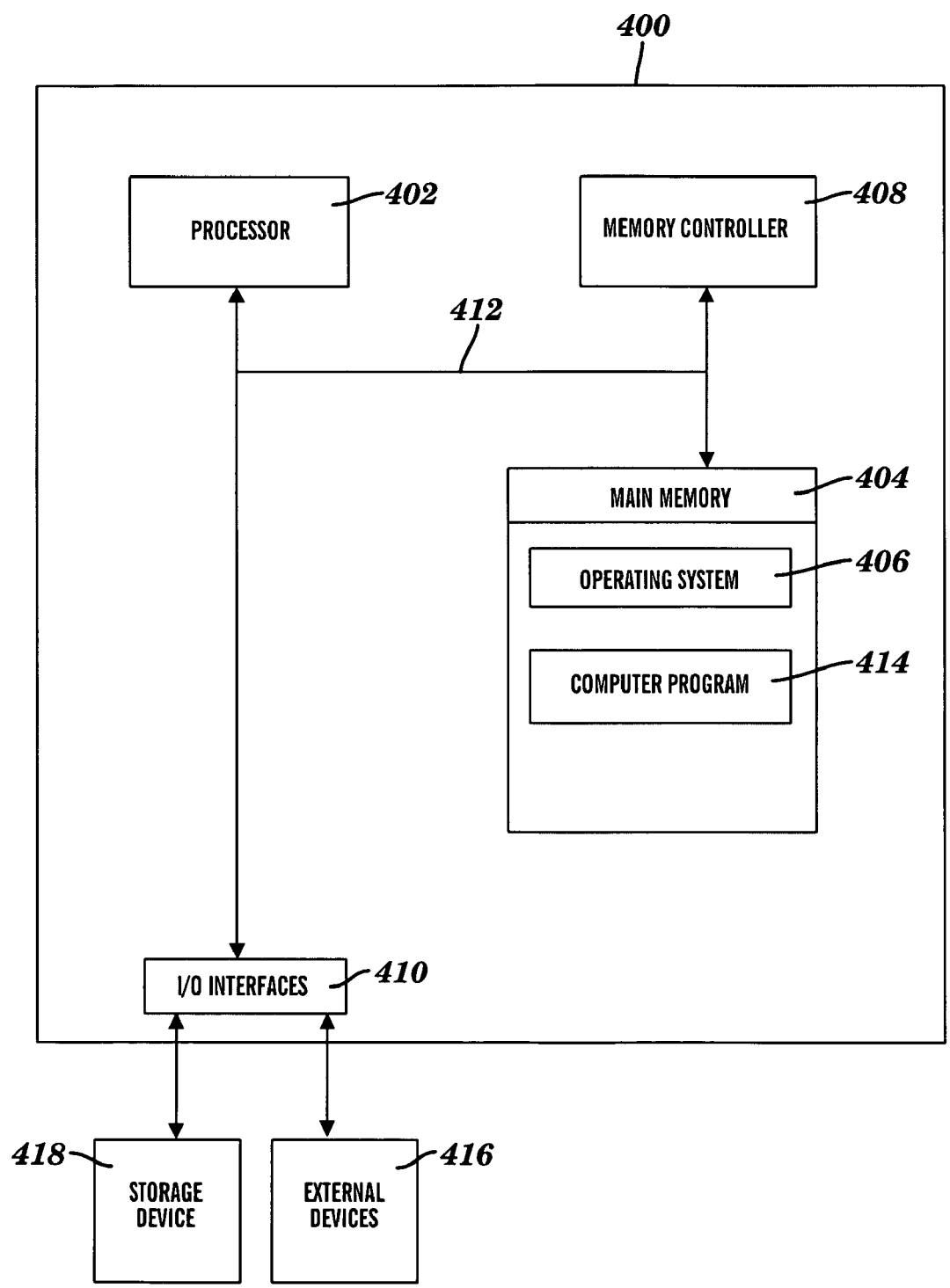
FIG. 4 depicts a computer system for implementing the extraction of data of buffers of the system of FIG. 1, in accordance with embodiments of the present invention.

FIG. 4 depicts a computer system for implementing the extraction of data of a buffer after a failure of an operating system in the system of FIG. 1, in accordance with embodiments of the present invention. Computer system 400 suitably comprises a processor 402, a main memory 404, a memory controller 408, and at least one input/output (I/O) interface 410, all of which are interconnected via a system bus 412. Main memory 404 includes an operating system 406 and a computer program 414. Main memory 404 is volatile memory (e.g., RAM) and includes an algorithm including the buffer extraction logic depicted in the flow diagram of FIG. 2. In one embodiment, computer program 414 includes an algorithm of the logic of FIG. 2. As an alternative to its position in FIG. 4, computer program 414 may be included within operating system 406. As one example, processor 402 is an Intel processor based on the x86 architecture, and operating system 406 is the Linux operating system.

Processor 402 performs computation and control functions of computer system 400, and comprises a suitable central processing unit. Processor 402 may comprise a single integrated circuit, such as a microprocessor, or may comprise any suitable number of integrated circuit devices and/or circuit boards working in cooperation to accomplish the functions of a processor. Processor 402 suitably executes one or more computer programs, including computer program 414. In one embodiment, processor 402 executes an algorithm implementing the logic depicted in the flow diagram of FIG. 2.

I/O interfaces 410 may comprise any system for exchanging information from external sources such as external devices 416. External devices 416 may comprise conventional external devices including a display monitor, keyboard, mouse, printer, plotter, facsimile, etc. Computer system 400 can be connected to one or more other computers via a communication interface using an appropriate communication channel (not shown) such as a modem communications path, a computer network, or the like. The computer network (not shown) may include a local area network (LAN), a wide area network (WAN), Intranet, and/or the Internet.

I/O interfaces 410 also allow computer system 400 to store and retrieve information (e.g., program instructions or data) from an auxiliary storage device 418, such as a non-volatile storage device (e.g., a CD-ROM drive which receives a CD-ROM disk (not shown)). Computer system 400 can store and retrieve information from other auxiliary storage devices (not shown), which can include a direct access storage device (DASD) (e.g., hard disk or floppy diskette), a magneto-optical disk drive, a tape drive, or a wireless communication device.

Memory controller 408, through use of a processor (not shown) separate from processor 402, is responsible for moving requested information from main memory 404 and/or through I/O interfaces 410 to processor 402. While for the purposes of explanation, memory controller 408 is shown as a separate entity, those skilled in the art understand that, in practice, portions of the function provided by memory controller 408 may actually reside in the circuitry associated with processor 402, main memory 404, and/or I/O interfaces 410.

It should be understood that main memory 404 will not necessarily contain all parts of all mechanisms shown. For example, portions of computer program 414 and operating system 406 may be loaded into an instruction cache (not shown) for processor 402 to execute, while other files may well be stored on magnetic or optical disk storage devices, such as storage device 418. In addition, although computer program 414 is shown to reside in the same memory location as operating system 406, it is to be understood that main memory 404 may consist of disparate memory locations.

A terminal interface of I/O interfaces 410 allows system administrators and computer programmers to communicate with computer system 400. Although computer system 400 depicted in FIG. 4 contains only a single main processor 402 and a single system bus 412, it should be understood that the present invention applies equally to computer systems having multiple processors and multiple system buses. Similarly, although system bus 412 is a typical hardwired, multidrop bus, any connection means that supports bi-directional communication in a computer-related environment could be used.

A computer system 400 in accordance with the present invention is, for example, a personal computer. However, those skilled in the art will appreciate that the methods and apparatus of the present invention apply equally to any computer system, regardless of whether the computer system is a complicated multi-user computing apparatus or a single user device such as a workstation.

Note that various modifications, additions, or deletions may be made to computer system 400 illustrated in FIG. 4 within the scope of the present invention such as the addition of cache memory or other peripheral devices. FIG. 4 is presented to simply illustrate some of the salient features of computer system 400.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks and CD-ROMs, and transmission type media such as digital and analog communication links, including wireless communication links.

Thus, the present invention discloses a method for deploying or integrating computing infrastructure, comprising integrating computer-readable code into computer system 400, wherein the code in combination with computer system 400 is capable of performing a process of extracting data of a buffer after a failure of an operating system.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

APPENDIX

Memsave.patch Code

The following code (memsave.patch) implements the easy-to-use novel infrastructure of the present invention, which serves as a common interface to be used by any log or trace tool. This code allows any component of the Linux kernel to register itself with a module to request that a specified memory region is preserved across reboots. Once a reboot occurs, the contents of the region can be written out like an ordinary file. The code provides a sample illustration with two registrations being made for preserving two different regions of memory. Upon a fast reboot, these two regions are abstracted as files.

```
---
    linux-patch-hari/arch/i386/Kconfig              |   6 ++
    linux-patch-hari/arch/i386/kernel/Makefile      |   2
    linux-patch-hari/arch/i386/kernel/mdummy.c      |  46 +++++++++++++++++
    linux-patch-hari/arch/i386/kernel/memsave.c     |  45 +++++++++++++++++
    linux-patch-hari/arch/i386/kernel/setup.c       |   6 ++
    linux-patch-hari/fs/proc/Makefile               |   1
    linux-patch-hari/fs/proc/proc_memsave.c         |  73 ++++++++++++++++++++++++++++
    linux-patch-hari/fs/proc/proc_misc.c            |  23 ++++++++
    linux-patch-hari/fs/proc/root.c                 |   4 +
    linux-patch-hari/include/asm-i386/memsave.h     |  58 ++++++++++++++++++++++++
    linux-patch-hari/include/linux/proc_fs.h        |   5 +
    11 files changed, 269 insertions(+)
diff -puN arch/i386/Kconfig~memsave arch/i386/Kconfig
--- linux-patch/arch/i386/Kconfig~memsave    2004-08-29 11:19:10.000000000 +0530
+++ linux-patch-hari/arch/i386/Kconfig 2004-08-29 11:20:55.000000000 +0530
@@ -864,6 +864,12 @@ config REGPARM
      generate incorrect output with certain kernel constructs when
      -mregparm=3 is used.
+config MEMSAVE
+     bool "preserve memory across reboots"
+     depends on KEXEC
+     help
+       Allow memory to be preserved across reboots
+
   endmenu
diff -puN arch/i386/kernel/setup.c~memsave arch/i386/kernel/setup.c
--- linux-patch/arch/i386/kernel/setup.c~memsave    2004-08-29 11:22:24.000000000 +0530
+++ linux-patch-hari/arch/i386/kernel/setup.c    2004-08-30 22:32:02.000000000 +0530
@@ -48,6 +48,7 @@
   #include <asm/io_apic.h>
   #include <asm/ist.h>
   #include <asm/io.h>
+#include <asm/memsave.h>
   #include "setup_arch_pre.h"
   #include <bios_ebda.h>
@@ -1097,6 +1098,9 @@ static unsigned long __int setup_memory
        }
     }
    #endif
+
+    reserve_bootmem(MEMSAVE_BASE, MEMSAVE_SIZE);
+
      return max_low_pfn;
   }
   #else
```

-continued

```
@@ -1358,6 +1362,8 @@ void __init setup_arch(char **cmdline_p)
  #endif
     paging_init( );
+     reserve_memsave_bootmem( );
+
  #ifdef CONFIG_EARLY_PRINTK
     {
        char *s = strstr(*cmdline_p, "earlyprintk=");
diff -puN /dev/null include/asm-i386/memsave.h
--- /dev/null 2003-01-30 15:54:37.000000000 +0530
+++ linux-patch-hari/include/asm-i386/memsave.h 2004-08-30 22:26:51.000000000
+0530
@@ -0,0 +1,58 @@
+/*
+ * Arch specific functions for the memory preserving reboot infrastructure
+ * API
+ *
+ * Created by: Hariprasad Nellitheertha
+ *
+ * Copyright (C) IBM Corporation, 2004. All rights reserved.
+ */
+
+#include <linux/bootmem.h>
+
+#define MEMSAVE_BASE 0x2000000
+#define MEMSAVE_SIZE 0x0001000 /* 1 page should be sufficient */
+#define MEMSAVE_ENTRY_SIG 0xaeaecece
+#define MEMSAVE_END_SIG 0xdeadbeef
+
+/* The memsave structure */
+
+struct memsave {
+    unsigned long sig;    /* Indicates end of list */
+    char name[10];        /* Name of the interface */
+    unsigned long start;  /* Start of memory region, physical address */
+    unsigned long size;   /* Size of the region */
+};
+
+extern int memsave_add_entry(struct memsave *);
+
+#ifdef CONFIG_MEMSAVE
+static inline void reserve_memsave_regions(void)
+{
+
+    struct memsave *bufp;
+    int n, i = MEMSAVE_SIZE / sizeof(struct memsave);
+
+    bufp = (struct memsave *)__va(MEMSAVE_BASE);
+
+    for (n = 0; n < i; n++) {
+       if (bufp->sig != MEMSAVE_ENTRY_SIG)
+          return;
+       /* Reserve the memory claimed by this entry */
+       reserve_bootmem(bufp->start, bufp->size);
+       (char *)bufp += sizeof(struct memsave);
+    }
+}
+
+static inline void reserve_memsave_bootmem(void)
+{
+    unsigned long *sig;
+
+    sig = (unsigned long *)__va(MEMSAVE_BASE);
+    if (*sig != MEMSAVE_ENTRY_SIG) /* List is empty */
+       *sig = MEMSAVE_END_SIG; /* Initialize the list */
+    else          /* There are entries. Reserve the regions */
+       reserve_memsave_regions( );
+}
+#else
+static inline void reserve_memsave_bootmem(void);
+#endif
diff -puN /dev/null arch/i386/kernel/memsave.c
--- /dev/null     2003-01-30 15:54:37.000000000 +0530
+++ linux-patch-hari/arch/i386/kernel/memsave.c 2004-08-31 00:20:00.000000000
+0530
@@ -0,0 +1,45 @@
+/*
+ * The APIs for the memory saving reboot infrastructure.
+ *
```

```
+ * Created by Hariprasad Nellitheertha
+ *
+ * Copyright (C) IBM Corporation, 2004. All rights reserved.
+ *
+ */
+
+#include <asm/errno.h>
+#include <asm/memsave.h>
+
+/*
+ * This routine adds a new memsave entry to the list. If no entry
+ * exists, a new one is initialized.
+ */
+int memsave_add_entry(struct memsave *msave)
+{
+
+    struct memsave *bufp;
+    int i = MEMSAVE_SIZE / sizeof(struct memsave);
+
+    bufp = (struct memsave *)__va(MEMSAVE_BASE);
+
+    /* Loop through the structure till we find an empty slot */
+    while ((i--) && (bufp->sig != MEMSAVE_END_SIG))
+        (char *)bufp += sizeof(struct memsave);
+
+    if (!i) /* No more entries accepted */
+        return -EFAULT;
+
+    /* We found an available slot. Register the entry.
+     * We do not validate the entry. Just copy it
+     */
+    memcpy(bufp, msave, sizeof(struct memsave));
+    bufp->sig = MEMSAVE_ENTRY_SIG;
+
+    /* Mark the next entry as available */
+    if (i > 1) {
+        (char *)bufp += sizeof(struct memsave);
+        bufp->sig = MEMSAVE_END_SIG;
+    }
+
+    return 0;
+}
diff -puN arch/i386/kernel/Makefile~memsave arch/i386/kernel/Makefile
--- linux-patch/arch/i386/kernel/Makefile~memsave    2004-08-29 13:50:53.000000000 +0530
+++ linux-patch-hari/arch/i386/kernel/Makefile 2004-08-30 20:27:27.000000000 +0530
@@ -32,6 +32,8 @@ obj-$(CONFIG_ACPI_SRAT)        += srat.o
   obj-$(CONFIG_HPET_TIMER)         += time_hpet.o
   obj-$(CONFIG_EFI)                += efi.o efi_stub.o
   obj-$(CONFIG_EARLY_PRINTK)       += early_printk.o
+obj-$(CONFIG_MEMSAVE)              += memsave.o
+obj-$(CONFIG_MEMSAVE)              += mdummy.o
   EXTRA_AFLAGS := -traditional
diff -puN fs/proc/proc_misc.c~memsave fs/proc/proc_misc.c
--- linux-patch/fs/proc/proc_misc.c~memsave    2004-08-29 20:44:57.000000000 +0530
+++ linux-patch-hari/fs/proc/proc_misc.c 2004-08-30 22:26:21.000000000 +0530
@@ -49,6 +49,7 @@
  #include <asm/io.h>
  #include <asm/tlb.h>
  #include <asm/div64.h>
+#include <asm/memsave.h>
  #define LOAD_INT(x) ((x) >> FSHIFT)
  #define LOAD_FRAC(x) LOAD_INT(((x) & (FIXED_1-1)) * 100)
@@ -689,6 +690,28 @@ void __init proc_misc_init(void)
             (size_t)high_memory - PAGE_OFFSET + PAGE_SIZE;
  }
  #endif
+#ifdef CONFIG_MEMSAVE
+    /* Scan through the entries and create files for registered
+     * entries
+     */
+    {
+        struct memsave *bufp;
+        int n, i = MEMSAVE_SIZE / sizeof(struct memsave);
+
+        bufp = (struct memsave *)__va(MEMSAVE_BASE);
+
```

```
+            for (n = 0; n < i; n++) {
+                if (bufp->sig != MEMSAVE_ENTRY_SIG)
+                    break;
+                entry = create_proc_entry(bufp->name, S_IRUSR, NULL);
+                if (entry) {
+                    entry->proc_fops = &proc_memsave_operations;
+                    entry->size = bufp->size;
+                }
+                (char *)bufp += sizeof(struct memsave);
+            }
+        }
+#endif
    if (prof_on) {
        entry = create_proc_entry("profile", S_IWUSR | S_IRUGO, NULL);
        if (entry) {
diff -puN include/linux/proc_fs.h~memsave include/linux/proc_fs.h
--- linux-patch/include/linux/proc_fs.h~memsave   2004-08-29 20:59:30.000000000 +0530
+++ linux-patch-hari/include/linux/proc_fs.h       2004-08-30 23:41:17.000000000 +0530
@@ -114,6 +114,11 @@ extern struct dentry *proc_lookup(struct
    extern struct file_operations proc_kcore_operations;
    extern struct file_operations proc_kmsg_operations;
    extern struct file_operations ppc_htab_operations;
+#ifdef CONFIG_MEMSAVE
+extern struct file_operations proc_memsave_operations;
+extern void memsave_dummy_entry(void);
+extern void memsave_dummy_entry_2(void);
+#endif
    /*
     * proc_tty.c
diff -puN fs/proc/Makefile~memsave fs/proc/Makefile
--- linux-patch/fs/proc/Makefile~memsave   2004-08-29 21:03:28.000000000 +0530
+++ linux-patch-hari/fs/proc/Makefile      2004-08-29 21:04:10.000000000 +0530
@@ -12,3 +12,4 @@ proc-y        += inode.o root.o base.o ge
   proc-$(CONFIG_PROC_KCORE)      += kcore.o
   proc-$(CONFIG_PROC_DEVICETREE) += proc_devtree.o
+proc-$(CONFIG_MEMSAVE)          += proc_memsave.o
diff -puN /dev/null fs/proc/proc_memsave.c
--- /dev/null   2003-01-30 15:54:37.000000000 +0530
+++ linux-patch-hari/fs/proc/proc_memsave.c    2004-08-31 00:20:19.000000000 +0530
@@ -0,0 +1,73 @@
+/*
+ * fs/proc/proc_memsave.c Contains the routines that abstract the saved
+ * memory regions as files.
+ *
+ * Created by: Hariprasad Nellitheertha
+ *
+ * Copyright (C) IBM Corporation, 2004. All rights reserved
+ *
+ */
+
+#include <linux/mm.h>
+#include <linux/proc_fs.h>
+#include <linux/capability.h>
+#include <linux/user.h>
+#include <linux/user.h>
+#include <asm/memsave.h>
+#include <asm/uaccess.h>
+#include <asm/io.h>
+
+static int open_memsave(struct inode * inode, struct file * filp)
+{
+    return capable(CAP_SYS_RAWIO) ? 0 : -EPERM;
+}
+
+static ssize_t read_memsave(struct file *, char __user *, size_t, loff_t *);
+
+struct file_operations proc_memsave_operations = {
+    .read    = read_memsave,
+    .open    = open_memsave,
+};
+
+/*
+ * read_memsave( )
+ *
+ * This routine provides the interface to read the saved memory regions.
+ * It uses the file pointer to identify the region based on the name. It
```

```
+ * then reads the corresponding memory region and returns it back to the
+ * user.
+ *
+ */
+static ssize_t read_memsave(
+struct file *file, char __user *buffer, size_t buflen, loff_t *fpos)
+{
+        struct memsave *msave;
+        int n;
+        void *region;
+
+        /* First, get to the correct entry in the list */
+        msave = (struct memsave *)__va(MEMSAVE_BASE);
+        for (n = 0; n < (MEMSAVE_SIZE / sizeof(struct memsave)); n++) {
+            if (msave->sig != MEMSAVE_ENTRY_SIG)
+                return -EFAULT;
+            if (!strcmp(msave->name, file->f_dentry->d_name.name))
+                break; /* Found the entry */
+            (char *)msave += sizeof(struct memsave);
+        }
+
+        if (msave->sig != MEMSAVE_ENTRY_SIG)
+            return -EFAULT;
+
+        if (buflen > msave->size - *fpos)
+            buflen = msave->size - *fpos;
+
+        region = __va(msave->start);
+
+        if (copy_to_user(buffer, region + *fpos, buflen)) {
+            return -EFAULT;
+        }
+
+        *fpos += buflen;
+
+        return buflen;
+}
diff -puN /dev/null arch/i386/kernel/mdummy.c
--- /dev/null       2003-01-30 15:54:37.000000000 +0530
+++ linux-patch-hari/arch/i386/kernel/mdummy.c  2004-08-30 23:38:01.000000000
+0530
@@ -0,0 +1,46 @@
+/*
+ * Contains code to create dummy entries for memsave.
+ *
+ * Created by Hariprasad Nellitheertha
+ *
+ * Copyright (C) IBM Corporation, 2004. All rights reserved.
+ *
+ */
+
+#include <asm/errno.h>
+#include <asm/memsave.h>
+
+struct memsave msave_dum;
+struct memsave msave_dum_2;
+
+/*
+ * Create a dummy entry to save a particular region
+ * Save 1 page starting from 144MB.
+ */
+void memsave_dummy_entry(void)
+{
+
+    int ret;
+
+    strcpy(msave_dum.name, "msave");
+    msave_dum.start = 0x09000000;
+    msave_dum.size = 0x1000;
+
+    ret = memsave_add_entry(&msave_dum);
+
+    strcpy((char *)0xc9000000, "harihari");
+}
+
+void memsave_dummy_entry_2(void)
+{
+
+    int ret;
```

-continued

```
+
+       strcpy(msave_dum_2.name, "msave2");
+       msave_dum_2.start = 0x0a000000;
+       msave_dum_2.size = 0x1000;
+
+       ret = memsave_add_entry(&msave_dum_2);
+
+       strcpy((char *)0xc9000000, "dummydummy");
+}
diff -puN fs/proc/root.c~memsave fs/proc/root.c
--- linux-patch/fs/proc/root.c~memsave 2004-08-30 22:30:59.000000000 +0530
+++ linux-patch-hari/fs/proc/root.c 2004-08-30 23:38:23.000000000 +0530
@@ -52,6 +52,10 @@ void __init proc_root_init(void)
        return;
   }
   proc_misc_init( );
+#ifdef CONFIG_MEMSAVE
+  memsave_dummy_entry( );
+  memsave_dummy_entry_2( );
+#endif
   proc_net = proc_mkdir("net", NULL);
#ifdef CONFIG_SYSVIPC
   proc_mkdir("sysvipc", NULL);
```

Instructions to Install and Run Code

The following instructions can be used to install and run the buffer extraction code provided above.

1) Obtain the Linux version 2.6.9-rc1 source code from http://www.kernel.org/
   Note: The code presented above has been prepared for this version of Linux.
   It can be upgraded to any level later.
2) Obtain the kexec and kexec-tools patches from
   http://www.xmission.com/~ebiederm/files/kexec/2.6.8.1-kexec3/
   http://www.xmission.com/~ebiederm/files/kexec/kexec-tools-1.96.tgz
3) Install the kexec-tools user space utilities per the instructions given in the package.
4) Untar the Linux kernel source code:
   tar -xzvf linux-2.6.9-rc1.tar.gz
5) Apply the kexec patch on to the Linux source code:
   patch -p1<kexec-file-name
6) Apply the memsave.patch (shown above in the Appendix) on to the code:
   patch -p1<memsave.patch
7) Build the Linux kernel and boot to it.
8) The patch will create two registrations with the infrastructure to save two regions of memory across the kexec boot. These will be registered as "msave" and "msave2".
9) Load the kexec kernel:
   kexec     -l<kernel-name>--append="<command-line-options>"
10) Reboot to the new kexec kernel:
    kexec -e
11) Observe that two files have been created under /proc:
    /proc/msave and /proc/msave2
12) Write out the two files using the "cp" command:
    cp /proc/msave file1
    cp /proc/msave2 file2

In order to validate that the correct memory regions are being preserved across reboots through this method, the code adds dummy identifier strings into the memory regions being preserved. The first region, represented by msave, includes a "harihari" string at the beginning. The second region, represented by msave2, includes a "dummydummy" string. After the reboot, once the files have been written out (see step 12 of the instructions listed above), each dummy identifier string can be found in its respective file, thereby verifying the method.

What is claimed is:

1. A method of extracting data of a buffer after a failure of an operating system in a computing environment, wherein said buffer is a region of a volatile memory in which said data is stored prior to said failure, said method comprising:
   registering an application prior to said failure, said registering comprising identifying a buffer in which data resides, said data stored in said buffer by said application, said application being executed under said operating system;
   reserving said buffer, said reserving maintaining said data residing in said buffer as unchanged from an initiation of a reboot of said operating system responsive to said failure to a completion of said reboot, said reboot being a fast reboot;
   generating an in-memory file during said reboot, said in-memory file pointing to said data residing in said buffer, and said in-memory file being stored in said volatile memory and not in a persistent storage medium; and
   extracting said data via an instruction operating on said in-memory file, said instruction executed by said application after said completion of said reboot.

2. The method of claim 1, wherein said extracting comprises:
   obtaining said data by referencing, in said instruction, an identifier of said in-memory file, said identifier identifying contents of said in-memory file without identifying any other contents of said volatile memory.

3. The method of claim 1, further comprising:
   providing a single interface providing said registering, automatically providing said reserving and said generating responsive to said registering, and facilitating said extracting via said registering, said reserving, and said generating, wherein any application storing, in a region of said volatile memory, content to be extracted after said failure is capable of utilizing said single interface to extract said content after said failure.

4. The method of claim 1, wherein said identifying a buffer comprises providing memory region information associated with said buffer, said information including an amount of said volatile memory required for storage of said data and a memory address at which said buffer starts.

5. The method of claim 4, further comprising storing said memory region information in meta data, said meta data comprising one or more data structures.

6. The method of claim 5, further comprising:
during said reboot and before an initiation of an allocation of said volatile memory during said reboot, preventing said buffer from being allocated for use by a user of one or more resources of said operating system, said preventing facilitated by a memory management module receiving said memory region information, said memory management module residing in said operating system.

7. The method of claim 5, wherein said meta data comprises a name identifying said application and an amount of said volatile memory required by said application.

8. The method of claim 5, further comprising dynamically updating said meta data in real time, responsive to a change in said memory region information.

9. The method of claim 1, wherein said generating comprises utilizing a platform-independent file format for said in-memory file.

10. A method for deploying computing infrastructure, comprising integrating computer-readable code into a computing system, wherein the code in combination with the computing system is capable of performing a process of extracting data of a buffer after a failure of an operating system in a computing environment, wherein said buffer is a region of a volatile memory in which said data is stored prior to said failure, said process comprising:
registering an application prior to said failure, said registering comprising identifying a buffer in which data resides, said data stored in said buffer by said application, said application being executed under said operating system;
reserving said buffer, said reserving maintaining said data residing in said buffer as unchanged from an initiation of a reboot of said operating system responsive to said failure to a completion of said reboot, said reboot being a fast reboot;
generating an in-memory file during said reboot, said in-memory file pointing to said data residing in said buffer, and said in-memory file being stored in said volatile memory and not in a persistent storage medium; and
extracting said data via an instruction operating on said in-memory file, said instruction executed by said application after said completion of said reboot.

11. The method of claim 10, wherein said extracting comprises:
obtaining said data by referencing, in said instruction, an identifier of said in-memory file, said identifier identifying contents of said in-memory file without identifying any other contents of said volatile memory.

12. The method of claim 10, said process further comprising:
providing a single interface providing said registering, automatically providing said reserving and said generating responsive to said registering, and facilitating said extracting via said registering, said reserving, and said generating, wherein any application storing, in a region of said volatile memory, content to be extracted after said failure is capable of utilizing said single interface to extract said content after said failure.

13. The method of claim 10, wherein said identifying a buffer comprises providing memory region information associated with said buffer, said information including an amount of said volatile memory required for storage of said data and a memory address at which said buffer starts.

14. The method of claim 13, said process further comprising storing said memory region information in meta data, said meta data comprising one or more data structures.

15. The method of claim 14, said process further comprising:
during said reboot and before an initiation of an allocation of said volatile memory during said reboot, preventing said buffer from being allocated for use by a user of one or more resources of said operating system, said preventing facilitated by a memory management module receiving said memory region information, said memory management module residing in said operating system.

16. The method of claim 14, wherein said meta data comprises a name identifying said application and an amount of said volatile memory required by said application.

17. The method of claim 14, said process further comprising dynamically updating said meta data in real time, responsive to a change in said memory region information.

18. The method of claim 10, wherein said generating comprises utilizing a platform-independent file format for said in-memory file.

* * * * *